United States Patent
Rancien et al.

(10) Patent No.: US 7,429,308 B2
(45) Date of Patent: Sep. 30, 2008

(54) METHOD OF MANUFACTURING AN ARTICLE COMPRISING AT LEAST ONE ELECTRONIC CHIP

(75) Inventors: Sandrine Rancien, La Murette (FR); Jacques Terliska, Saint-Aupre (FR)

(73) Assignee: Arjo Wiggins Security SAS, Issy les Moulineaux (FR)

( * ) Notice: Subject to any disclaimer, the term of this patent is extended or adjusted under 35 U.S.C. 154(b) by 187 days.

(21) Appl. No.: 10/472,828

(22) PCT Filed: Jul. 30, 2002

(86) PCT No.: PCT/FR02/02742
§ 371 (c)(1),
(2), (4) Date: Dec. 23, 2003

(87) PCT Pub. No.: WO03/015016
PCT Pub. Date: Feb. 20, 2003

(65) Prior Publication Data
US 2004/0154766 A1 Aug. 12, 2004

(30) Foreign Application Priority Data
Jul. 30, 2001 (FR) .................................. 01 10178

(51) Int. Cl.
*D21H 21/42* (2006.01)
*G06K 19/077* (2006.01)

(52) U.S. Cl. .................... 162/140; 162/124; 162/134; 283/83; 283/94

(58) Field of Classification Search ................ 162/140, 162/124, 134; 283/83, 94
See application file for complete search history.

(56) References Cited

U.S. PATENT DOCUMENTS

| | | | | |
|---|---|---|---|---|
| 4,534,398 A | * | 8/1985 | Crane | 162/103 |
| 5,352,762 A | * | 10/1994 | Nagai et al. | 528/322 |
| 5,528,222 A | * | 6/1996 | Moskowitz et al. | 340/572.7 |
| 5,566,441 A | * | 10/1996 | Marsh et al. | 29/600 |
| 5,567,276 A | * | 10/1996 | Boehm et al. | 162/103 |
| 5,697,649 A | * | 12/1997 | Dames et al. | 283/83 |
| 5,841,422 A | * | 11/1998 | Shyu | 345/604 |
| 5,976,699 A | * | 11/1999 | Hosomi et al. | 428/418 |
| 6,050,494 A | * | 4/2000 | Song et al. | 235/492 |
| 6,111,506 A | * | 8/2000 | Yap et al. | 340/572.1 |
| 6,138,913 A | * | 10/2000 | Cyr et al. | 235/468 |
| 2002/0167500 A1 | * | 11/2002 | Gelbman | 345/204 |

FOREIGN PATENT DOCUMENTS

| | | |
|---|---|---|
| DE | 196 01 358 A1 | 7/1996 |
| DE | 19833746 A1 * | 2/2000 |
| DE | 19849762 A1 * | 5/2000 |
| GB | 1365876 * | 9/1974 |
| WO | WO 00/39391 A | 7/2000 |

* cited by examiner

*Primary Examiner*—Steven P. Griffin
*Assistant Examiner*—Dennis Cordray
(74) *Attorney, Agent, or Firm*—Oliff & Berridge, PLC

(57) ABSTRACT

The present invention provides a method of manufacturing an article comprising a fiber layer and at least one electronic chip, the fiber layer being formed by depositing fibers on a surface immersed in a dispersion of fiber material. The method includes the following step:

Using an elongate flexible support to bring the electronic chip into contact with the fiber layer that is being formed.

16 Claims, 3 Drawing Sheets

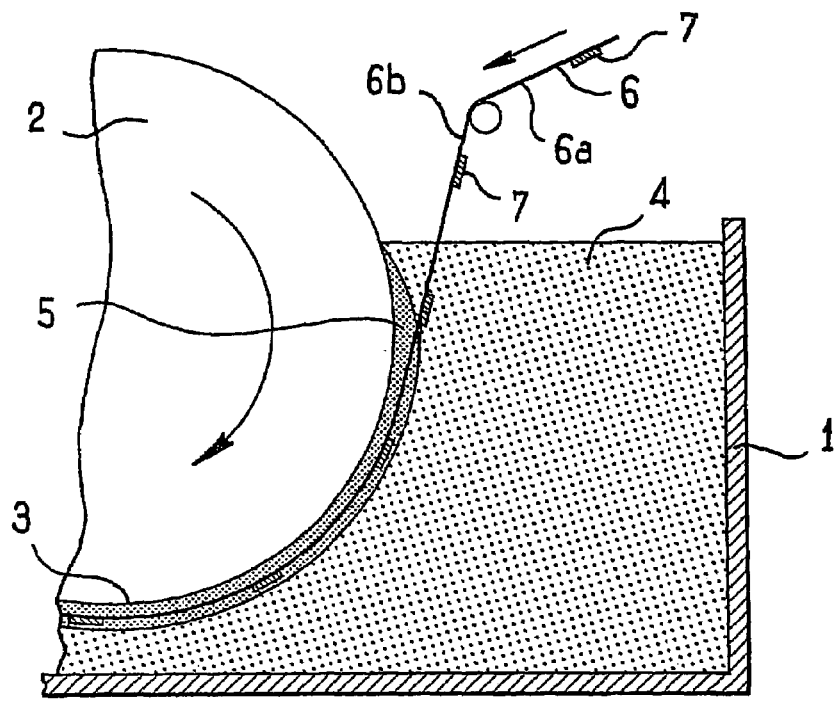
FIG_1
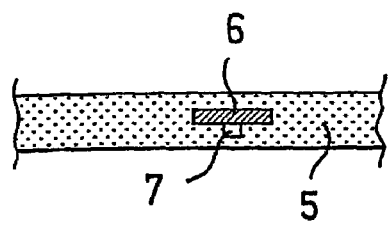
FIG_2
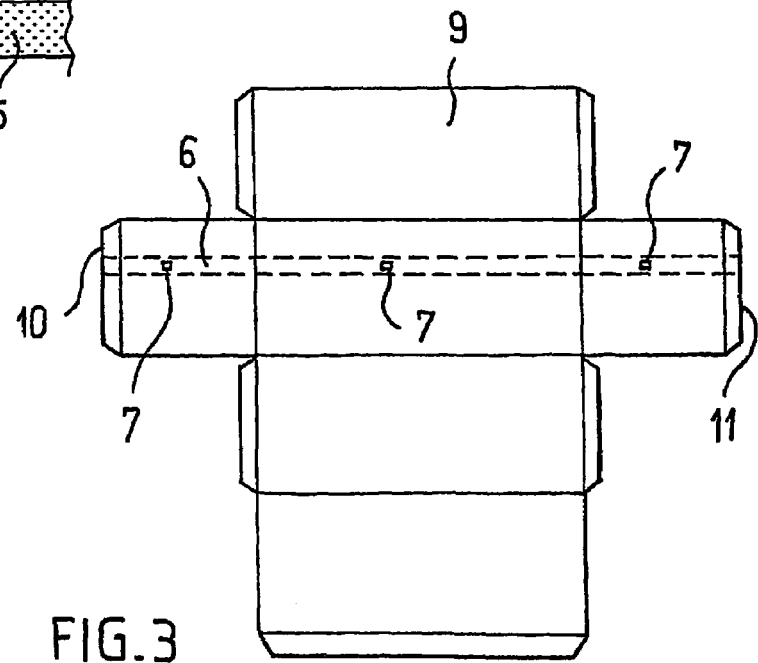
FIG_3

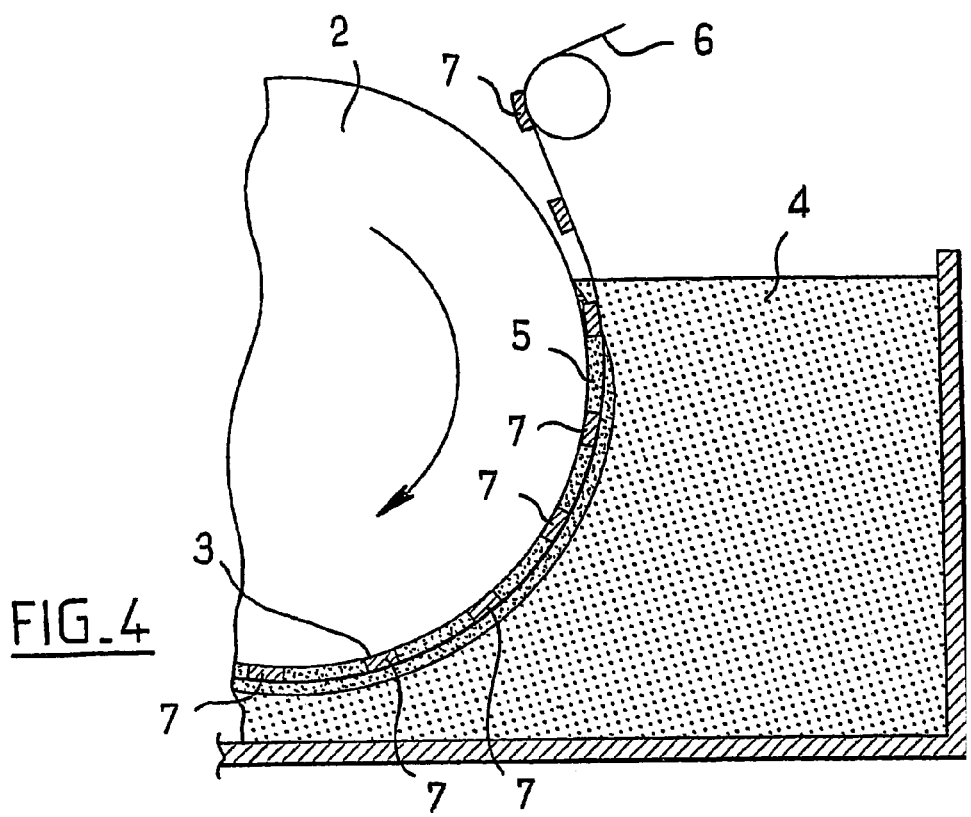
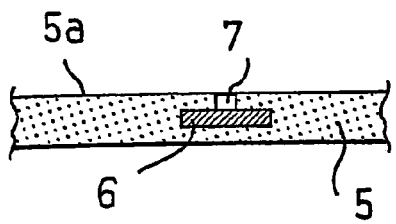
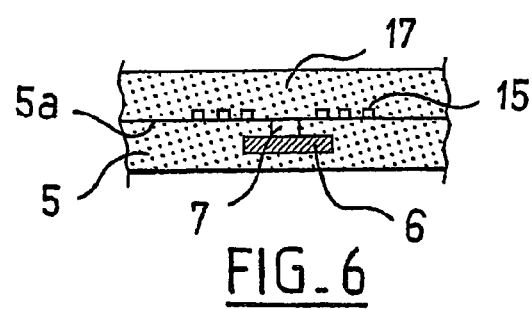
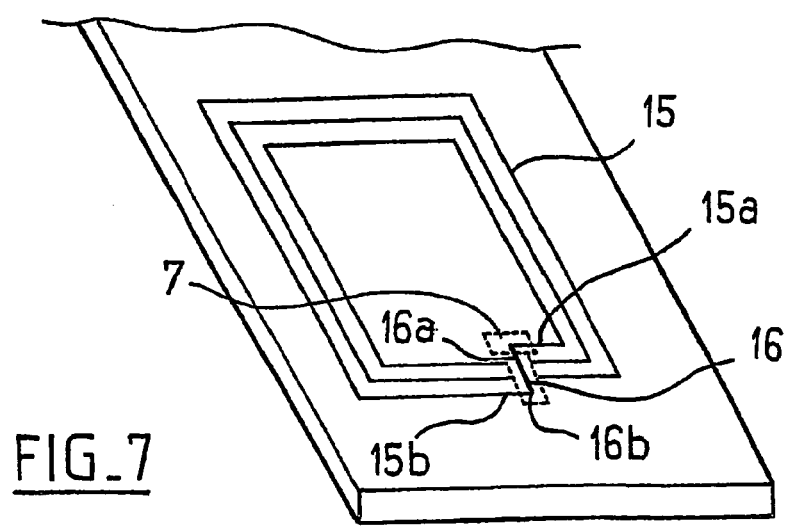

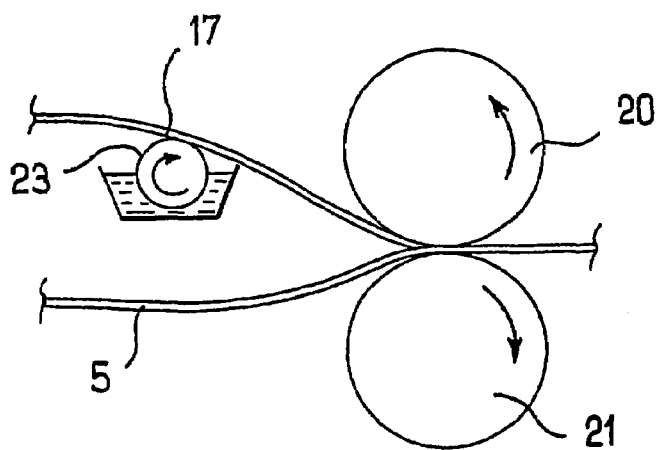
FIG_8
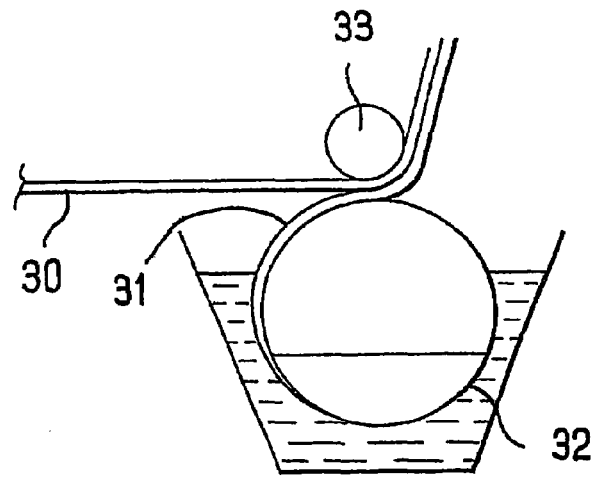
FIG_9
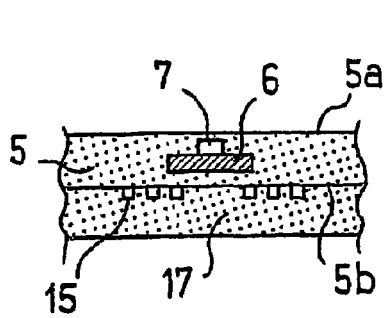
FIG_11
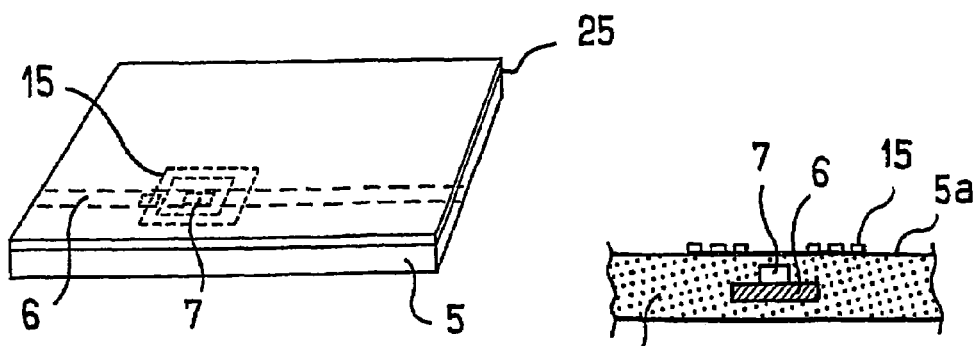
FIG_10
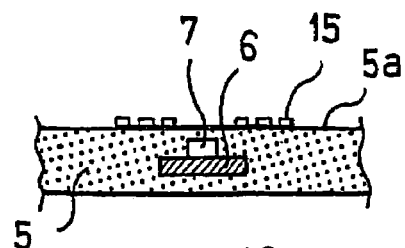
FIG_12

METHOD OF MANUFACTURING AN ARTICLE COMPRISING AT LEAST ONE ELECTRONIC CHIP

This application is a 371 of PCT/FR02/02742, filed Jul. 30, 2002 and claims priority to French Application No. 01 10178, filed Jul. 30, 2001.

The present invention relates to a method of manufacturing an article comprising a fiber layer and at least one electronic chip.

BACKGROUND OF THE INVENTION

International application WO 99/54842 describes a bank bill made of paper having a security thread including an electronic chip of semiconductive organic polymer. The security thread includes metallized portions in order to provide direct contact with apparatus for reading data stored in the chip, in order to power it electrically. No indication is given about how the bank bill is manufactured.

German patent application DE 198 33 746 discloses a traveler's check obtained by placing a strip of polymer material including an electronic chip on a first layer of paper and applying a second layer of paper thereto so that the polymer strip is sandwiched between the two layers. Because of the presence of the above-mentioned strip between the two layers, the article presents increased thickness all along its length.

German patent application DE 196 01 358 discloses a paper article that includes a micromodule embedded in its thickness, the micromodule being constituted by an integrated circuit and a metal support.

German patent application DE 196 30 648 discloses a bank bill having an interrupted security strip and an electronic chip disposed between the two portions of the strip.

OBJECTS AND SUMMARY OF THE INVENTION

The present invention seeks to provide a novel method of manufacturing an article presenting increased security, the article comprising at least one fiber structure and at least one electronic chip, and in particular an article in which the risk of the electronic chip being removed without damaging the article is reduced and in which the electronic chip is difficult to identify.

The invention thus provides a method of manufacturing an article comprising a fiber layer and at least one electronic chip, the fiber layer being formed by depositing fibers on a surface immersed in a dispersion of fiber material, and the method including the following step:

using an elongate flexible support to bring the electronic chip into contact with the fiber layer that is being formed.

In the invention, the support and the chip can be bonded to the fiber layer without giving rise to perceptible extra thickness, thus making the chip difficult to detect.

In addition, the chip cannot be removed without damaging the article, since it is secured to the support and the support is embedded in the thickness of the fiber layer, possibly being covered completely on both faces by the fibers.

The support is advantageously coated, preferably on both faces, in a heat-sealable varnish which improves its behavior within the fiber layer.

The chip may be placed on an outside surface of the support, without being embedded therein.

The width of the support may lie in the range 1 millimeter (mm) to 50 mm, and in particular in the range 1 mm to 10 mm, for example. It may be electrically conductive, except possibly where the chip is located, being made of metal or otherwise, being metallized or otherwise, and possibly being partially made of metal or metallized. When the chip needs to be connected to an antenna made on the support to enable the chip to operate without contact, the support should be non-conductive, at least in some locations so as to avoid short-circuiting the antenna or the contacts of the chip. The support can thus be non-electrically conductive, at least where the chip is located.

In an embodiment, the support is oriented relative to the surface on which the fibers are deposited during formation of the fiber layer in such a manner that the chip is situated on the face of the support that faces away from said surface. The fiber layer can then cover the chip and its support completely. The support can be brought into contact with the fiber layer that is being formed once a certain thickness of fibers has already been deposited on said surface, thereby enabling the support and the chip to be completely embedded in the fiber layer.

In a variant, the support is placed in such a manner as to enable the chip to come into contact with said surface, preferably before it is immersed. Thus, the chip can be incorporated in the fiber layer while coming flush with one face thereof. Such a disposition is advantageous, particularly when the chip is subsequently to be connected to an antenna that is printed or transferred on the fiber layer, as described below, or implemented by other means, such as metallization, demetallization, or photogravure, for example. The above-specified face can then be covered in at least one further layer which may be fibrous or non-fibrous so that the support and the chip are finally undetectable both visually and to the touch.

The above-mentioned immersed surface may be defined by the immersed portion of a partially immersed paper-making "wire", in particular the immersed portion of a rotary wire cylinder in a papermaking machine having a partially immersed cylinder.

In an implementation, the chip is connected to an antenna comprising at least one turn. The antenna may be carried by the support used for bringing the chip into the dispersion of papermaking fibers. In particular, the antenna may extend around the chip on the support. The antenna may also be disposed entirely on the chip or it may extend at least in part over the support.

The support and the chip need not necessarily have an antenna. In particular, the antenna may be made after the fiber layer has been formed by printing one or more turns on a face of the fiber layer, preferably by silk-screen printing, using a conductive ink.

In particular, the antenna may be made by means of a method comprising the following steps:
using a conductive ink to make a series of turns on a face of the layer;
using an insulating ink to make an insulating bridge over the turns;
using a conductive ink to make a conductive track on the insulating bridge and connected to one of the ends of the turns; and
connecting the chip to the conductive track and to the other end of the turns by means of a conductive resin.

The antenna may also be made by gravure or by transfer.

The antenna can act as an induction coil, presenting dimensions that are greater than the dimensions of the chip, so as to enable detection to take place in its proximity or vicinity, having a range of 1 centimeter (cm) to 70 cm, approximately, for example.

As mentioned above, the antenna can also be made directly on the chip, particularly for short-range detection, when a range of 1 mm to 1 cm approximately suffices.

The chips may be based on silicon.

The chips used may serve solely for reading data, or in a variant, they may be suitable both for reading and for writing data.

Reading and writing on the chip can be made secure by means of a password. The transmitted data may be encrypted. The chip may also comprise an "anti-collision" system, specifically for use under circumstances when a plurality of chips are present simultaneously in the field of a contactless reader apparatus.

The chips may comprise respective programmable microcontrollers.

In a particular implementation of the invention, the support, the antenna, or the chip, in particular a varnish or an encapsulation of the chip, may include authentication elements selected so as to avoid disturbing the operation of the chip. These authentication elements may be compounds that are magnetic, opaque, or visible in transmission, compounds that emit light under white, ultraviolet or infrared light, in particular near-infrared, or biomarkers, this list not being exhaustive.

Advantageously, the thickness of the fiber layer and the nature of the material constituting it are selected in such a manner as to protect the chip and the antenna from any impacts associated with processing the fiber layer to make the article, and associated with using the article.

The fiber layer may comprise cellulose fibers and/or artificial or synthetic fibers and/or cotton linters.

The fiber layer may be a single layer. In a variant, the fiber layer including the chip may be assembled with a second layer, e.g. another fiber layer, the two layers being bonded by being laminated, for example.

A plurality of chips and associated supports may be integrated in the fiber layer simultaneously, with the layer subsequently being cut up so as to retain only one chip per article.

The support and the corresponding chip may themselves be cut from strips of an insulating film, e.g. made of polyester, having the chips fixed thereto, preferably at regular intervals, possibly together with the associated antennas.

The above-specified strips including the chips may be integrated in a single web of paper while manufacturing said paper, in a cylinder machine, said paper comprising cellulose fibers and possibly artificial or synthetic fibers.

In an implementation of the invention, an article is made comprising a fiber layer and at least one electronic chip by a method comprising the following steps:

introducing a chip by means of a flexible support into a first fiber suspension while making a first web of paper in a papermaking machine, in particular a machine having at least one cylinder;

for each chip, providing the web of paper formed in this way with an antenna;

connecting the antenna to the chip with a conductive resin;

making a second web of paper by means of a endless wire machine or cylinder machine using a second fiber suspension; and laminating the two previously-made webs together, the chips being situated on the inside.

In such an example, the strips carrying the chips do not have antennas, and they are inserted partway into the thickness of the first web of paper so that the chips are directly accessible from one side of the web, the remainder of the strip being embedded in the thickness of the paper. The antenna can then be applied by printing, transfer, or gravure. The chip does not give rise to any localized extra thickness and therefore does not modify the outside appearance of the article.

In an implementation of the invention, an article is made comprising a fiber layer and at least one electronic chip by a method comprising the following steps:

providing a film having electrically insulating properties at least in the vicinity of chips and any antennas, provided at preferably regular intervals with antennas;

fixing chips on the film by connecting each chip to an antenna, the chips being disposed at preferably regular intervals on the film;

cutting the film into strips each comprising a line of chips and antennas; and inserting the strips into paper made up of two united webs each coming, for example, from a cylinder machine, a dual cylinder machine, or a cylinder and endless wire machine, etc.

Advantageously, the film is coated in a heat-sealable varnish on both faces so as to improve the behavior of the strip in the layer.

The strip carrying the chips may be introduced into the thickness of the first web so that the chips are flush with one side of the web, the remainder of the strip being embedded in the thickness of the paper. The second web then covers the first web on the same side as the chips. The resulting article does not present any localized extra thickness.

The invention also provides an article obtained by implementing the above-defined method.

Such an article can constitute a cardboard pack, for example.

The article can also be self-adhesive, in particular constituting a sticky label. Such a label can comprise a fiber layer including the chip and covered in adhesive on one face.

The invention also provides an article comprising a fiber layer coming from a single web of paper, the strip that is not electrically conductive in the vicinity of the chip extending continuously between two ends of the article, a chip provided with an optionally integrated antenna being fixed on said strip, said strip being entirely covered by the fibers of the fiber layer as is the chip, the article not presenting any perceptible extra thickness over the chip or the strip.

The invention also provides an article comprising at least two layers, including a fiber layer receiving in its thickness a strip and a chip stuck thereto, an antenna electrically connected to the chip, said antenna being situated at the interface between the two layers, said strip being completely covered by the fibers of the fiber layer. The strip also extends continuously between two edges of the article and the article does not present any perceptible extra thickness in the vicinity of the strip or the chip. The chip comes flush with the face of the fiber layer that comes into contact with the other layer.

Independently of the above-mentioned aspects, the invention also provides an article comprising:

at least one fiber layer;

an electronic chip in the fiber layer, said chip comprising an integrated first antenna; and a second antenna coupled in inductive manner to said integrated first antenna, without physical electrical contact between the first and second antennas.

The second antenna may constitute an authentication element, and in particular it may be optically variable.

The second antenna may comprise a film which has been demetallized in such a manner as to create the turns of the antenna. The film may be a holographic film. The second antenna may also be a hologram other than a demetallized hologram.

The electronic chip may be fixed on a support of elongate shape, in particular a strip, which may be completely covered by the fiber layer.

The support may extend from a first edge of the article to a second edge, opposite from the first.

BRIEF DESCRIPTION OF THE DRAWINGS

Other characteristics and advantages of the present invention appear on reading the following detailed description of non-limiting implementations, and on examining the accompanying drawings, in which:

FIG. 1 is a diagram showing a step of the method of manufacturing a fiber layer in a first implementation of the invention;

FIG. 2 is a diagrammatic and fragmentary view in cross-section of the resulting fiber layer;

FIG. 3 is a diagrammatic and fragmentary view of a cardboard pack including a chip;

FIG. 4 is a diagram showing a step in the method of manufacturing a fiber layer in a second implementation of the invention;

FIG. 5 is a diagram showing a fragmentary cross-section of the resulting fiber layer;

FIG. 6 is a diagram showing a fragmentary cross-section of an article comprising two fiber layers;

FIG. 7 is a fragmentary perspective diagram of a fiber layer having an antenna formed thereon which is connected to the chip;

FIG. 8 is a diagram showing two fiber layers being laminated together;

FIG. 9 is a diagram showing another method of making and assembling two fiber layers;

FIG. 10 is a diagram showing a portion of an adhesive label in accordance with the invention;

FIG. 11 is a diagrammatic fragmentary view of an article constituting a variant embodiment of the invention; and FIG. 12 is a diagrammatic fragmentary view of an article constituting another variant embodiment of the invention.

MORE DETAILED DESCRIPTION

For reasons of clarity, the relative proportions between the various elements shown in the drawings are not always complied with, the views being diagrammatic.

FIG. 1 is a fragmentary and diagrammatic view of a cylinder machine for making paper. The machine comprises a vessel 1 containing a suspension 4 of fibers, for example cellulose fibers and/or cotton linters and/or synthetic and/or artificial fibers, with a rotary wire cylinder 2 being partially immersed therein to define a surface 3 having a fiber layer 5 being formed continuously in contact therewith.

While it is being formed, an elongate support is incorporated in the fiber layer 5. The support is constituted by a strip 6 carrying on one face 6a a plurality of electronic chips 7 disposed at regular intervals. The strip 6 is also referred to as a "thread" since its width is relatively narrow, for example lying in the range 1 mm to 50 mm. In the present application, the terms "thread" and "strip" should be considered as being synonyms.

The chips 7 are of passive type, enabling data to be transmitted without contact, each chip being connected to an antenna comprising at least one turn, and preferably a plurality of turns.

The chips 7 are based on silicon, for example, and they can be about 200 micrometers (μm) thick. The thickness of the chips should be selected as a function of the thickness of the fiber layer.

The antennas can be of dimensions greater than the dimensions of the chips, thus making detection possible in the immediate proximity or the vicinity thereof, for example detection at a range of at least 1 cm and possibly up to 70 cm. In a variant, when short distance detection suffices, i.e. at a range of at least 1 mm but not more than about 1 cm, the antenna can be made directly on the same substrate as the chip.

Thus, in the example of FIGS. 1 and 2, each of the chips 7 has an antenna integrated therein. These can be chips sold under the name IC-Link® by thee supplier Inside Technologies, presenting together with the corresponding antenna dimensions of about 2.2 mm by 2.3 mm and a thickness of about 250 μm. These chips operate in read and write modes at a frequency of 13.56 MHz and they can be detected at a distance of up to 5 mm.

The strip 6 is obtained as follows.

To begin with, an epoxy, a cyanoacrylate, or an isocyanate adhesive is used to fix a plurality of chips 7 on a polyester film, e.g. a film that is about 12 μm thick. Thereafter a heat-sealable varnish is optionally deposited thereon to reinforce adhesion in the fiber layer, the varnish used possibly including fluorescent or magnetic security compounds. The varnish is raised to a temperature which is sufficiently high during manufacture of the structure by means of heat from the rollers with which the fiber layer comes into contact, for example. Then the film is cut into strips each having a width of about 3 mm, the chips 7 being placed on a surface of the film so as to be spaced apart at 20 cm from one another along the length of each strip 6. The resulting strips 6 are wound on reels while waiting to be integrated in the paper.

Each strip 6 is incorporated in the fiber layer 5 by being brought into contact with fibers that have just become deposited on the immersed surface 3 of the cylinder 2, as shown in FIG. 1.

The side 6b of the strip 6 that does not carry chips 7 faces towards the surface 3 of the wire so that the fiber material covers the strip completely including its chips 7 when the web of paper leaves the cylinder machine together with the strip 6 and the chips 7.

FIG. 2 shows that the strip 6 and the chips 7 are completely embedded within the thickness of the fiber layer 5 so that the chip 7 is not detectable visually or to the touch and does not give rise to any extra thickness.

The fiber layer 5 may present a final thickness of about 400 μm and constitute paper board, for example.

After drying, the fiber layer 5 can be cut so as to form a cardboard pack 9, for example as shown in FIG. 3.

It can be seen that the strip 6 extends continuously between two opposite edges 10 and 11 of the pack 9. Thus, the strip 6 or the chip 7 cannot be removed without damaging the pack 9, given that the force of adhesion between the chip 7 and the strip 6 is very strong.

It would not go beyond the ambit of the present invention for the chip 7 not to be in direct contact with an antenna configured to enable the detection range to be increased, for example.

By way of example, it is possible to use a chip which is configured to be capable of coupling with an antenna 15 inductively.

The chip is preferably centered relative to the antenna 15, as shown in FIG. 11.

Since the antenna 15 does not make direct contact with the chip, it can be made, for example, on the face 5b of the fiber layer 5 which is situated beside the support 6 or on another web.

The dimensions of the antenna 15 can be significantly larger than the dimensions of the chip, thereby enabling detection to be performed at a relatively great distance.

The chip and antenna assembly as obtained in this way can also present good ability to withstand external stresses because of the absence of any physical connection between the chip and the antenna.

In the example described, it is possible to use an IC-Link® chip as mentioned above, which chip includes an integrated antenna. Said antenna is coupled in inductive manner to an antenna 15.

Another fiber layer 17 may optionally be assembled with the fiber layer 5, as shown in FIG. 11.

In another implementation of the invention, chips 7 that are initially not provided with antennas are stuck onto a film, e.g. a polyester film. The chips 7 can be constituted, for example, by those sold under the name I CODE by the supplier Philips, which chips operate in read and write modes at a frequency of 13.56 MHz and can be detected at a distance of up to 1.5 meters (m) depending on the antenna used.

The film is then cut up into strips 6 that are 2 mm wide, with the chips 7 being spaced apart on each strip at 20-cm intervals.

As shown in FIG. 4, each strip 6 is brought into the cylinder machine under controlled tension so that the chips 7 come into contact with the surface 3 of the wire prior to the fiber material becoming deposited thereon. As a result, the chips 7 are flush in one of the faces 5a of the fiber layer 5, as can be seen in FIG. 5, while the thread 6 is itself embedded.

Thereafter, an antenna 15 can be made for each chip 7 as follows.

A conductive ink, e.g. a silver-based ink, is silkscreen printed on the face 5a of the fiber layer 5 to form a series of turns. The conductive ink may also include authentication elements selected so as to avoid disturbing the operation of the chip, for example compounds that are fluorescent, being suitable for being excited by ultraviolet or infrared radiation, or else being constituted by biomarkers. The printed turns have two ends 15a and 15b, with the first end 15a being close to the chip 7, as can be seen in FIG. 7.

Thereafter, an insulating ink is used to print an insulating bridge passing over the turns between the two ends 15a and 15b, and a conductive ink is used to form a conductive track 16 on the bridge, said track being electrically connected via one end 16b to the end 15b of the turns. The other end 16a of the track 16 and the end 15a of the turns are connected to the chip 7 by means of conductive ink.

The antenna 15 of the FIG. 11 embodiment can also be made using a conductive ink.

In a variant, the antenna 15 described with reference to FIG. 7 or 11 can be made by transfer or by gravure.

The antenna 15 can also be put into place on the fiber material in some other way.

The antenna 15 can be obtained, for example, by transferring a hologram comprising a metal layer that has been locally demetallized, so as to form conductive tracks, as shown in FIG. 12.

The antenna can be present on the outside face 5a.

Thus, the antenna 15 can also constitute a security element as a result of the properties of optical variability presented by the hologram.

The antenna 15 can also be made by transferring a metal pattern, e.g. a copper pattern.

The antenna 15 can also be made by electrolytically depositing a metal, for example, on a support previously printed with a conductive ink forming the pattern of the antenna. The support is then assembled with the fiber layer carrying the chip, e.g. by being laminated therewith.

With reference again to the FIG. 7 embodiment, once the antenna 15 has been connected to the chip 7, the fiber layer 5 is assembled to a second layer 17, e.g. a fiber layer presenting a thickness of about 100 µm and covering the face 5a.

The two fiber layers 5 and 17 can be assembled together, for example, by lamination using adhesive deposited by a roller 23 between two cylinders 20 and 21 of a laminating machine, as shown in FIG. 8, with the resulting paper presenting a total thickness of 400 µm and being suitable for cutting out to form a pack such as the pack shown in FIG. 3.

As in the preceding example, the resulting pack does not present any perceptible extra thickness in the zone containing the strip 6 and the chip 7, so they remain undetectable visually or to the touch.

In another implementation of the invention, the support 6 is constituted by a polyester strip that is 90 µm thick and 4 cm wide. The chips 7 which are fixed to said strip 6 can be identical to those of the preceding example, for example. The antennas can be printed or transferred onto the support, and each electrically connected to a chip. The antennas can also be made by metallization, demetallization, or photogravure.

In this example, a two-cylinder machine is used to form a first fiber layer 30 in which the strip 6 is incorporated in such a manner that the chips 7 are flush with one of the faces of the fiber layer, by proceeding as described with reference to FIG. 4.

The thickness of the first web of paper is about 400 µm, for example.

A second web of paper 31 is made in parallel, having a thickness of 100 µm, for example, and the two webs 30 and 31 are assembled together while in the wet state by passing between the wire cylinder used for making the second web 31 and a roller 33, the second web 31 covering the chips 7, as shown in FIG. 9.

The resulting card is dried on the papermaking machine at a temperature of about 100° C. and presents a thickness of 500 µm. As in the preceding examples, the chips 7 are not detectable either visually or to the touch.

In another implementation of the invention, after the step of incorporating chips in the fiber layer 5, as shown in FIG. 4, and after the step of making antennas by silkscreen printing, instead of assembling the fiber layer 5 with a second fiber layer 17, said fiber layer 5 is dried and then assembled with a silicone-covered protective film 25 that is covered oh its face turned towards the fiber layer 5 in a pressure-sensitive adhesive. The protective film 25 is intended to be removed at the moment of use.

The fiber layer 5 covered in the protective film 25 can be cut so as to form adhesive labels, such as the label shown in FIG. 10, each label having a chip 7.

The chip can be used as a security element in a passport, for example.

Thus, in an implementation of the invention, a 50-µm thick Flexchip® chip is stuck onto a 13-µm thick strip, with the silicon of the chip being planed down in order to reduce its thickness.

The strip is incorporated in a fiber layer as in the preceding implementation, and is then connected to an antenna and laminated with adhesive to the paper covering a passport.

The invention makes it possible to provide effective authentication means, since any attempt at removing the chip will inevitably result in the article being visibly damaged.

Furthermore, the fiber layer in which the chip is integrated contributes to protecting it against impacts.

Naturally, the invention is not limited to the implementations described above.

The fiber layer can receive the treatments that are usual in papermaking and can include conventional elements for preventing falsification and for providing security.

The chip may perform functions of authentication and/or of traceability.

The chip may also provide protection against theft when its frequency corresponds to the frequency of detection gates.

What is claimed is:

1. An article being one of a security document, a cardboard pack or a sticky label, comprising:
    at least one fiber layer;
    an electronic chip in the at least one fiber layer, said electronic chip comprising an integrated first antenna; and
    a second antenna coupled in inductive manner to said first antenna, without physical electrical contact between the first and second antennas.

2. An article according to claim 1, wherein the second antenna constitutes an authentication element.

3. An article according to claim 1, wherein the second antenna comprises a film which is demetallized in such a manner as to create the turns of the antenna.

4. An article according to claim 3, wherein the film is a holographic film.

5. An article according to claim 4, wherein the electronic chip is fixed on a strip of film of an elongate shape.

6. An article according to claim 5, wherein the strip of film is completely covered by the fiber layer.

7. An article according to claim 5, wherein the strip of film extends from a first edge of the article to a second edge, opposite from the first.

8. An article according to claim 1, wherein the first antenna comprises at least one turn.

9. A method of manufacturing an article comprising a fiber layer and at least one electronic chip, the fiber layer being formed by depositing fibers on a surface, the method comprising:
    using an elongate flexible film carrying the at least one electronic chip to bring the at least one electronic chip into contact with the surface on which the fiber layer is being formed,
    wherein the film remains in contact with the fiber layer in the article manufactured,
    wherein at least one of the film, the at least one electronic chip, or a possible antenna, comprises at least one authentication element, and
    wherein the at least one authentication element comprises at least one biomarker.

10. A method of manufacturing an article comprising a fiber layer and at least one electronic chip, the fiber layer being formed by depositing fibers on a surface, the method comprising:
    using an elongate flexible film to bring the at least one electronic chip into contact with the fiber layer that is being formed,
    wherein the at least one electronic chip comprises an integrated first antenna and the article comprises a second antenna coupled in inductive manner to the integrated first antenna, without physical electrical contact between the first and second antennas.

11. A method according to claim 10, wherein the second antenna defines an authentication element.

12. A method according to claim 11, wherein the second antenna is optically variable.

13. A method according to claim 10, wherein the second antenna comprises a film which is demetallized so as to create turns of the second antenna.

14. A method according to claim 13, wherein the film with the second antenna is a holographic film.

15. An article comprising:
    a fiber layer comprising a single web of paper,
    a strip of film that is not electrically conductive at least in a location of a chip and that extends continuously between two ends of the article, and
    an electronic chip being fixed on the strip of film at a location where the strip is not electrically conductive, the strip and the electronic chip being completely covered by the fibers of the fiber layer,
    wherein the electronic chip comprises an integrated first antenna and the article comprises a second antenna coupled in inductive manner to the integrated first antenna, without physical electrical contact between the first and second antennas.

16. The article of claim 15, wherein the second antenna is separate from the strip of film.

* * * * *